(12) United States Patent
Miyazaki et al.

(10) Patent No.: US 8,037,990 B2
(45) Date of Patent: Oct. 18, 2011

(54) LUBRICATION CONTROLLING METHOD FOR STARTING CLUTCH

(75) Inventors: Tomoyuki Miyazaki, Fukuroi (JP);
Shun Kitahara, Fukuroi (JP); Manabu Sawayanagi, Fukuroi (JP); Masaki Sakai, Fukuroi (JP); Yosuke Ikeda, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 731 days.

(21) Appl. No.: 12/113,928

(22) Filed: May 1, 2008

(65) Prior Publication Data
US 2008/0277232 A1   Nov. 13, 2008

(30) Foreign Application Priority Data
May 8, 2007   (JP) ................................. 2007-123085

(51) Int. Cl.
*F16D 13/74*   (2006.01)
(52) U.S. Cl. .............. 192/113.35; 192/70.12; 192/85.61
(58) Field of Classification Search ............. 192/113.35, 192/85.61
See application file for complete search history.

(56) References Cited

U.S. PATENT DOCUMENTS

| | | | | |
|---|---|---|---|---|
| 2,837,192 A | * | 6/1958 | Dunkelow | 192/85.29 |
| 3,351,169 A | * | 11/1967 | Mcindoe | 192/85.61 |
| 3,823,802 A | * | 7/1974 | Winzeler et al. | 192/106 F |
| 4,134,483 A | * | 1/1979 | Horsch | 192/113.35 |

FOREIGN PATENT DOCUMENTS

JP   2004-324818 A   11/2004

* cited by examiner

*Primary Examiner* — Richard M. Lorence
(74) *Attorney, Agent, or Firm* — Miles & Stockbridge P.C.

(57) ABSTRACT

A lubrication controlling method for a starting clutch including a wet type multi-plate clutch disposed between a transmission and an engine of a vehicle and adapted to transmit a power, the method including always supplying lubricant oil during an operation of the wet type multi-plate clutch, continuously changing a flow amount of the lubricant oil in accordance with a condition of the wet type multi-plate clutch, and controlling the amount of the lubricant oil so that a supplied amount of the lubricant oil during an idle rotation of the wet type multi-plate clutch is greater than a supplied amount of the lubricant oil during the complete engagement of the wet type multi-plate clutch.

3 Claims, 2 Drawing Sheets

LUBRICANT OIL

LUBRICATION CONTROLLING METHOD FOR STARTING CLUTCH

BACKGROUND OF THE INVENTION

1. Field of the Invention

The present invention relates to a unit type starting clutch which can be fitted with respect to a torque converter of an automobile and the like.

2. Description of the Related Art

Conventionally, in automatic transmissions i.e. ATs, the starting of a vehicle was performed by torque transmitting through a torque converter. The torque converter was mounted to many AT vehicles since the torque converter has a torque amplifying effect and provides smooth torque transmission.

On the other hand, the torque converter has a disadvantage that a large amount of slip is generated during the torque transmission and, thus, the torque converter has less efficiency.

Therefore, in recent years, there has been proposed a technique in which a starting clutch is used in place of the torque converter, and the torque has been amplified at a low speed range by reducing a gear ratio and by increasing the number of speed change stages.

In general, the starting clutch includes a wet type multi-plate clutch housed in a clutch case. In the multi-plate clutch, friction plates as friction engaging elements at an output side and separator plates as friction engaging elements at an input side are arranged alternately along an axial direction. With this arrangement, a power is transmitted by engaging the friction plates with the separator plates by means of a piston.

In the starting clutch, particularly when the vehicle is operating under heavy traffic conditions, engagement and disengagement of the clutch are repeated frequently, causing heat to accumulate in the clutch portion, and thus requiring a large amount of lubricant oil to be supplied to the clutch portion. However, power loss caused by a pump for supplying the large amount of lubricant oil adversely impacts the reduction of fuel consumption.

In the wet type starting clutch, when the vehicle begins to start, i.e., when the wet type multi-plate clutch is engaged, a maximum amount of heat is generated. Conventionally, in order to cool such heat, a large amount 10 liters/min or more) of lubricant oil was always supplied. In the wet type multi-plate clutch, the lubricant oil is required to perform the cooling upon the engagement of the clutch, and the lubricant oil is also required to cool the heated clutch having a high temperature during an idle rotation of the clutch. In general, during the engagement of the clutch, since it is difficult for the supplied lubricant oil to flow between the plates of the clutch, even if the lubricant oil is supplied, it is difficult to cool the clutch.

To address such a problem, for example, Japanese Patent Application Laid-open No. 2004-324818 discloses a technique in which the lubricant oil is supplied in accordance with a condition of the vehicle by using an electronic hydraulic solenoid. However, in this technique, the large amount of the lubricant oil is supplied to the clutch during a slipping condition of the clutch, and, if the engagement and disengagement of the clutch is repeated frequently, adequate cooling cannot be achieved.

SUMMARY OF THE INVENTION

Accordingly, an object of the present invention is to control a flow amount of lubricant oil in accordance with a tightened or engaged condition of a starting clutch continuously to reduce power loss, thereby preventing thermal damage of the clutch.

To achieve the above object, the present invention provides a lubrication controlling method for a starting clutch including a wet type multi-plate clutch disposed between a transmission and an engine of a vehicle and adapted to transmit a power, the method comprising the steps of always supplying lubricant oil during an operation of the wet type multi-plate clutch, continuously changing a flow amount of the lubricant oil in accordance with a condition of the wet type multi-plate clutch, and controlling the amount of the lubricant oil so that a supplied amount of the lubricant oil during an idle rotation of the wet type multi-plate clutch becomes greater than a supplied amount of the lubricant oil during the complete engagement of the wet type multi-plate clutch.

According to the starting clutch of the present invention, the following effects can be achieved.

By using a flow amount control valve controlled by operating pressure of a piston to control a flow amount of the starting clutch, an electronic hydraulic solenoid can be eliminated.

Since the flow amount of the lubricant oil is changed continuously in accordance with the condition of the starting clutch, by flowing a relatively larger amount of the lubricant oil during the disengagement of the clutch than during the engagement of the clutch, the starting clutch can be cooled effectively without generating excessive power loss.

Further, when the vehicle is running normally, since the starting clutch is situated in an engaging condition having no slip, heat is not generated, but the starting clutch is hard to be cooled. According to the present invention, since the lubricant oil is always supplied in a smaller amount than that supplied during the idle rotation so that the starting clutch can be cooled even during the engagement, even if the engagement and disengagement of the clutch are repeated frequently, the starting clutch can be cooled adequately.

Further features of the present invention will become apparent from the following description of exemplary embodiments with reference to the attached drawings.

DESCRIPTION OF THE EMBODIMENTS

Now, an embodiment of the present invention will be fully explained with reference to the accompanying drawings. Incidentally, it should be noted that the embodiment which will be described hereinafter is merely an example and other alterations can be made.

Figure 1:
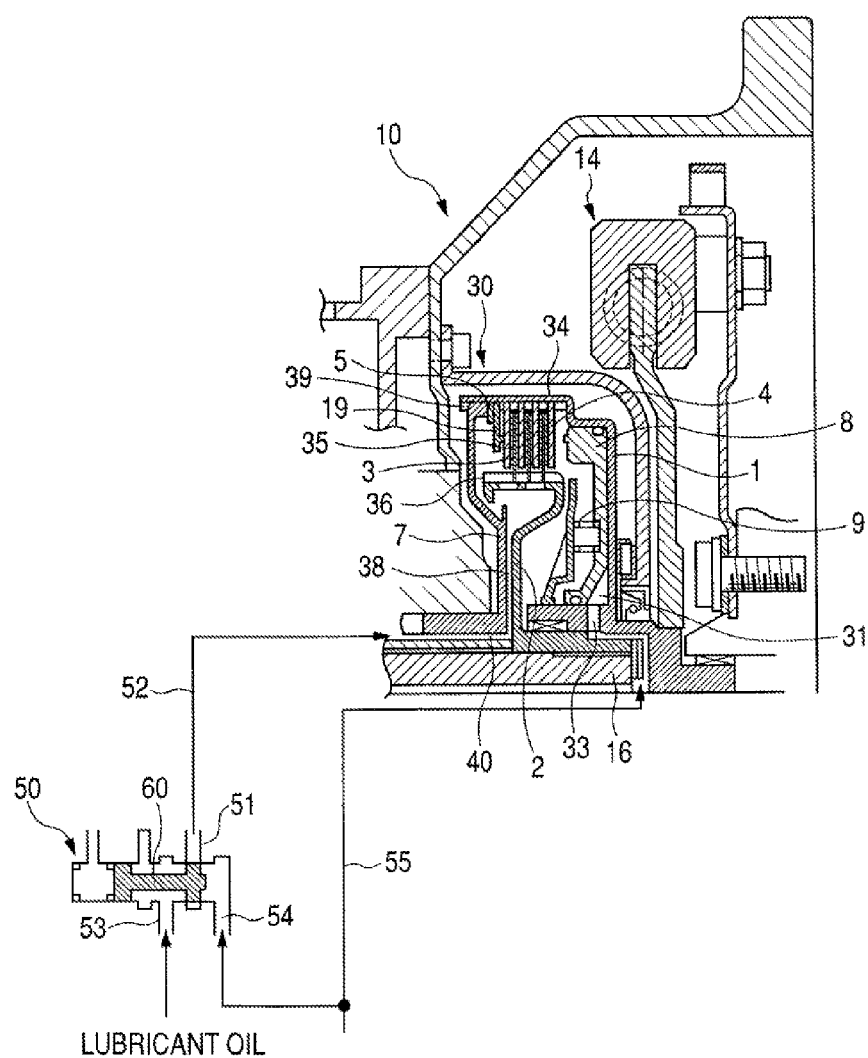
FIG. 1 is an axial sectional view of a starting clutch, for explaining an embodiment of a lubrication controlling method for a starting clutch according to the present invention.

FIG. 1 is an axial sectional view of a starting clutch, for explaining an embodiment of a lubrication controlling method and a lubrication controlling apparatus for a starting clutch according to the present invention. A starting clutch 10 comprises a clutch drum or clutch case 1, and a wet type multi-plate clutch 30 housed in the clutch case. Within the clutch case 1 of the wet type multi-plate clutch 30, substantially annular friction plates 3 as friction engaging elements at an output side and substantially annular separator plates 4 as friction engaging elements at an input side are arranged alternately along an axial direction. At one end (open end) of the clutch case 1, a substantially annular backing plate 19 is fixedly supported by a substantially annular stop ring 5 in the axial direction, thereby holding the separator plate 4.

The annular clutch case 1 is provided at its outer periphery with a drum portion 34. The drum portion 34 is provided at its inner periphery with a spline portion 39 with which the separator plates 4 are engaged for an axial sliding movement.

In the illustrated embodiment, although the wet type multi-plate clutch 30 is constituted by three friction plates 3 and three separator plates 4, it should be noted that the number of the input and output side friction engaging elements can be changed voluntarily in accordance with required torque. Further, substantially annular friction materials 35 or a plurality of friction material segments 35 are secured to both axial surfaces of the friction plate 3 by an adhesive or the like. Further, friction materials may be secured to the separator plates 4, or the friction materials 35 may be secured to one of the surfaces of the friction plate 3 and the separator plate 4 alternately.

In FIG. 1, a piston 8 is provided within a closed end portion of the clutch case 1. The piston 8 is mounted within the clutch case 1 for an axial movement so that the piston can abut against the separator plate 4 to apply an urging force to the separator plate.

A hydraulic chamber 31 is defined between the piston 8 and an inner surface of the clutch case 1, which hydraulic chamber is maintained in an oil-tight condition by two O-rings. By supplying hydraulic oil from an oil path (described later) to the hydraulic chamber 31, the shifting movement of the piston 8 is controlled, thereby applying a predetermined urging force to the piston 8. A spring 9 for always biasing the piston 8 toward the hydraulic chamber 31 in a clutch released condition is provided at a side of the piston opposite to the hydraulic chamber 31.

When predetermined hydraulic pressure is supplied to the hydraulic chamber 31, the piston 8 is shifted to the left in FIG. 1, thereby tightening the wet type multi-plate clutch 30 between the piston and the backing plate 19.

The friction plate 3 of the wet type multi-plate clutch 30 is provided with grooves (not shown) communicating between an inner diameter side and an outer diameter side, and each groove is formed to have a depth substantially the same as a thickness of the friction material 35 and a circumferential width greater than 3 mm. With this arrangement, a cooling effect is enhanced even in the engagement condition of the starting clutch 10 which is hard to be cooled. Further, according to the present invention, since the lubricant oil is always supplied with the flow amount smaller than that during the idle rotation so as to cool the clutch even during the engagement thereof, the cooling efficiency is further enhanced.

A hub member 2 fitted on an input shaft 16 to be rotated integrally with the input shaft 16 of the transmission is provided at its outer periphery with a spline portion 36. The friction plates 3 are mounted to the spline portion 36 for an axial sliding movement. Accordingly, a power inputted from a crank shaft (not shown) is transmitted to the transmission (not shown) through a damper device 14 (described later), clutch case 1, wet type multi-plate clutch 30, hub member 2 and the input shaft 16.

The clutch case 1 of the wet type multi-plate clutch 30 is provided with the above-mentioned damper device 14 as a shock absorbing mechanism for absorbing shock generated upon the engagement of the clutch. The damper device 14 includes a spring and a retainer plate for holding the spring.

An axial one end of the input shaft 16 is provided at its outer periphery with a spline portion into which the hub member 2 is fitted. Accordingly, the input shaft 16 and the hub member 2 are rotated integrally with each other.

A cover member 7 is provided at an open end portion of the clutch case 1. An outer diameter edge portion of the cover member 7 is fitted in a spline portion 39 of the clutch case 1. Thus, the cover member 7 is rotated together with the clutch case 1. A narrow lubricant oil passage 40 is defined between the cover member 7 and the hub member 2. As can be seen from FIG. 1, by providing the cover member 7, the wet type multi-plate clutch 30 is disposed in a substantially closed space.

Now, an oil path for the lubricant oil for lubricating the wet type multi-plate clutch 30 and an oil path for supplying the oil to the hydraulic chamber 31 will be explained. The lubricant oil for lubricating the wet type multi-plate clutch 30 and the oil supplied to the hydraulic chamber 31 are controlled by an oil pump (not shown) and a flow amount control valve 50 connected to a hydraulic control device.

The lubricant oil is supplied into the flow amount control valve 50 from a lubricant oil supplying source (not shown) via an inlet 53. The lubricant oil flowing from an outlet 51 is used to lubricate the wet type multi-plate clutch 30, and the same hydraulic pressure as that supplied from an operating oil path 55 to the hydraulic chamber 31 is added to an inlet 54.

The flow amount control valve 50 serves to control an amount of lubricant oil exiting from the outlet 51 by a shifting movement of a spool 60. The lubricant oil from the outlet 51 passes through a lubricant oil path 52 and flows between the output shaft 16 and the cover member 7 and passes through a path 38 defined between the hub member 2 and the cover member 7 to be directed toward the wet type multi-plate clutch 30.

If necessary, a pressure control valve may be provided in the hydraulic oil path 55. In order to engage the wet type multi-plate clutch 30, the piston 8 is driven by increasing the pressure in the hydraulic chamber 31. If the pressure is decreased below a predetermined value, the piston 8 is shifted to the right in FIG. 1 by the biasing force of the spring 9, thereby releasing the wet type multi-plate clutch 30.

The flow amount control valve 50 controls the amount of the lubricant oil passing through the lubricant oil path 52 as follows. During the operation of the wet type multi-plate clutch 30, the supplying of the lubricant oil from the outlet 51 is always controlled to supply the lubricant oil. Further, in accordance with the condition (idle rotation, slip, tightening, etc) of the wet type multi-plate clutch 30, the flow amount of the lubricant oil is changed continuously. Further, the flow amount control valve 50 controls to always flow the lubricant oil.

Further, the amount of the lubricant oil is controlled so that, when the wet type multi-plate clutch 30 is rotated idly, the supplied amount of the lubricant oil becomes greater than the supplied amount of the lubricant oil during the full engagement of the clutch.

The flow amount control valve 50 continuously changes the amount of the lubricant oil in accordance with the change in pressure for operating the wet type multi-plate clutch 30. That is to say, if the pressure for tightening the wet type multi-plate clutch 30 is below a first set value capable of running the vehicle at a low speed, the flow amount of the lubricant oil is maximized, and, if the pressure is above a second set value for tightening the wet type multi-plate clutch 30 completely, the flow amount of the lubricant oil is minimized, and, if the tightening pressure is between the first and second tightening pressure values, the flow amount of the lubricant oil is changed continuously.

Figure 2:
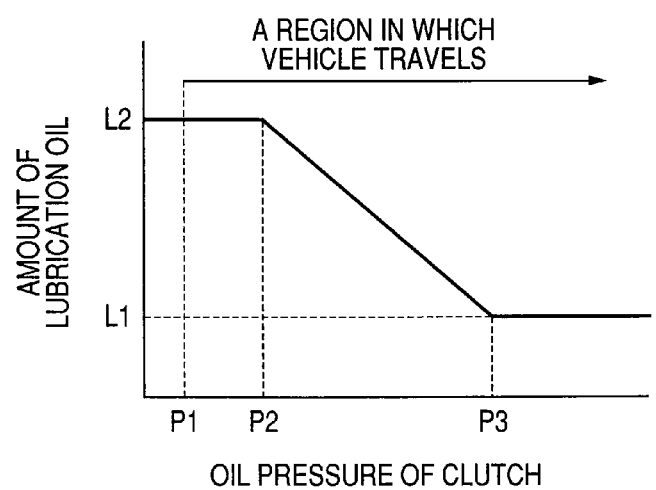
FIG. 2 is a graph showing a relationship between oil pressure of the clutch and an amount of lubricant oil.

Here, the control of the lubricant oil according to the present invention will be explained. FIG. 2 is a graph showing a condition of the clutch, i.e. a relationship between the oil pressure of the clutch and the amount of the lubricant oil.

As shown in FIG. 2, when the oil pressure of the clutch has a low value P1, the starting clutch 10 is still rotated idly, and, when the oil pressure of the clutch reaches a value P2, the starting clutch begins to engage. The vehicle can be run due to the slip condition generated at the value P2 of the oil pressure of the clutch. When the oil pressure of the clutch is further increased and reaches a value P3, the starting clutch is engaged completely. As can be seen from FIG. 2, the amount of the lubricant oil is controlled to have a maximum value L2 during the idle rotation of the starting clutch 10 and a minimum value L1 upon complete tightening of the clutch.

In the lubrication controlling method of the present invention, as shown in FIG. 2, it is possible to control to achieve an optimum condition while monitoring the oil pressure of the clutch, i.e. the operating pressure of the piston.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-123085, filed May 8, 2007, which is hereby incorporated by reference herein in its entirety.

What is claimed is:

1. A lubrication controlling method for a starting clutch including a wet type multi-plate clutch disposed between a transmission and an engine of a vehicle and adapted to transmit a power, comprising the steps of:

continuously supplying lubricant oil during an operation of the wet type multi-plate clutch;

continuously changing a flow amount of the lubricant oil in accordance with a condition of the wet type multi-plate clutch; and controlling the amount of the lubricant oil so that a supplied amount of the lubricant oil during an idle rotation of the wet type multi-plate clutch is greater than a supplied amount of the lubricant oil during complete engagement of the wet type multi-plate clutch, wherein the controlling is performed so that when a monitored tightening pressure of the wet type multi-plate clutch is below a first set value capable of running the vehicle at a low speed, the flow amount of the lubricant oil is maximized, when the monitored tightening pressure is above a second set value for tightening the wet type multi-plate clutch completely, the flow amount of the lubricant oil is minimized, and when the monitored tightening pressure is between the first and second set values, the flow amount of the lubricant oil is changed continuously in accordance with change in the monitored tightening pressure.

2. A lubrication controlling method according to claim 1, wherein the step for continuously changing the flow amount of the lubricant oil is performed by controlling a flow control valve by an operating pressure of a piston for operating the wet type multi-plate clutch.

3. A lubrication controlling method according to claim 1, wherein the step for continuously changing the flow amount of the lubricant oil is performed such that the flow amount changes linearly with respect to the monitored tightening pressure.

* * * * *